US012502884B2

(12) United States Patent
Maurer et al.

(10) Patent No.: US 12,502,884 B2
(45) Date of Patent: Dec. 23, 2025

(54) CAN DECORATOR INSPECTION AND CONTROL SYSTEM AND ADJUSTMENT ASSEMBLIES

(71) Applicant: Stolle Machinery Company, LLC, Centennial, CO (US)

(72) Inventors: Joseph John Allen Maurer, Aurora, CO (US); Bryon L. Kajfosz, Littleton, CO (US); Sayon Chandrakanthan, Lakewood, CO (US); Russell Bauer, West Chester, OH (US); Daniel A. Jansen, Cincinnati, OH (US); Ian K. Scholey, Barnsley (GB)

(73) Assignee: Stolle Machinery Company, LLC, Centennial, CO (US)

(*) Notice: Subject to any disclaimer, the term of this patent is extended or adjusted under 35 U.S.C. 154(b) by 0 days.

(21) Appl. No.: 18/643,278

(22) Filed: Apr. 23, 2024

(65) Prior Publication Data

US 2024/0359454 A1 Oct. 31, 2024

Related U.S. Application Data

(60) Provisional application No. 63/461,619, filed on Apr. 25, 2023.

(51) Int. Cl.
*B41F 3/00* (2006.01)
*B41F 17/20* (2006.01)
*B41F 33/00* (2006.01)

(52) U.S. Cl.
CPC .......... *B41F 33/0036* (2013.01); *B41F 17/20* (2013.01)

(58) Field of Classification Search
CPC ............................ B41F 17/20; B41F 33/0036
See application file for complete search history.

(56) References Cited

U.S. PATENT DOCUMENTS

| | | | |
|---|---|---|---|
| 3,828,668 | A | 8/1974 | Zugcic |
| 4,491,613 | A | 1/1985 | Hahn |
| 10,675,861 | B2 | 6/2020 | Kilde et al. |
| 10,882,306 | B2 | 1/2021 | Cochran et al. |
| 11,338,566 | B2 | 5/2022 | Sebesta et al. |

(Continued)

FOREIGN PATENT DOCUMENTS

JP H05338120 A * 12/1993

OTHER PUBLICATIONS

JP H05-338120 and Translation, Hara (Year: 1993).*

(Continued)

*Primary Examiner* — David H Banh
(74) *Attorney, Agent, or Firm* — Eckert Seamans Cherin & Mellott, LLC

(57) ABSTRACT

A control system for a can decorator structured to apply images to cans includes a can inspection system structured to capture images of a can, a controller structured to receive the captured images and to analyze the captured images to determine a quality of the image applied to the can based on a comparison of the captured images and a reference image, and an adjustment assembly structured to adjust a circumferential or translational position of a plate cylinder attached to a plate cylinder shaft end of a plate cylinder shaft, the adjustment assembly including at least one stepper motor, wherein operation of the at least one stepper motor causes the circumferential or translational adjustment.

18 Claims, 11 Drawing Sheets

(56) References Cited

U.S. PATENT DOCUMENTS

| | | | | |
|---|---|---|---|---|
| 2002/0112636 | A1* | 8/2002 | Desaulniers | B41F 31/002 101/487 |
| 2006/0266003 | A1* | 11/2006 | Topf | B67C 3/007 141/146 |
| 2007/0234909 | A1 | 10/2007 | Day | |
| 2014/0253718 | A1* | 9/2014 | Leitzen | B21D 51/26 348/86 |
| 2015/0068421 | A1* | 3/2015 | Kre | B41F 27/1218 101/486 |
| 2016/0175785 | A1* | 6/2016 | Li | B01F 25/312 99/323.1 |
| 2016/0229198 | A1* | 8/2016 | Izume | B41F 17/22 |
| 2017/0334659 | A1* | 11/2017 | Leitzen | B41F 17/002 |
| 2018/0009216 | A1* | 1/2018 | Egerton | B41N 10/02 |
| 2020/0130345 | A1* | 4/2020 | Egerton | B41F 33/02 |
| 2020/0130347 | A1 | 4/2020 | Egerton et al. | |
| 2021/0170741 | A1* | 6/2021 | Sebesta | B41F 33/0081 |
| 2023/0334649 | A1* | 10/2023 | Li | G06T 7/11 |

OTHER PUBLICATIONS

U.S. Commissioner for Patents PCT/ISA/US, PCT Application No. PCT/US24/25823, International Search Report and Written Opinion, Sep. 18, 2024, 20 pages.

* cited by examiner

CAN DECORATOR INSPECTION AND CONTROL SYSTEM AND ADJUSTMENT ASSEMBLIES

CROSS REFERENCE TO RELATED APPLICATIONS

This application claims priority to U.S. Patent Application Ser. No. 63/461,619, Apr. 25, 2023, entitled, Can Decorator Inspection And Control System And Adjustment Assemblies.

FIELD OF THE INVENTION

The disclosed concept relates generally to can decorators and, in particular, to can decorator inspection and control systems. The disclosed concept also relates to adjustment assemblies for can decorators.

BACKGROUND OF THE INVENTION

High speed continuous motion machines for decorating cans, commonly referred to as "can decorator machines" or simply "can decorators," are generally well known. FIG. 1 shows a can decorator 2. As shown in FIG. 1, a can decorator 2 includes an infeed conveyor 15, which receives cans 16 from a can supply (not shown) and directs them to arcuate cradles or pockets 17 along the periphery of spaced parallel rings secured to a pocket wheel 12. The pocket wheel 12 is fixedly secured to a continuously rotating mandrel carrier wheel 18, which in turn is keyed to a continuously rotating horizontal drive shaft 19. Horizontal spindles or mandrels (not shown), each being pivotable about its own axis, are mounted to the mandrel carrier wheel 18 adjacent its periphery. Downstream from the infeed conveyor 15, each spindle or mandrel is in closely spaced axial alignment with an individual pocket 17, and undecorated cans 16 are transferred from the pockets 17 to the mandrels. Suction applied through an axial passage of the mandrel draws the can 16 to a final seated position on the mandrel.

While mounted on a mandrel, each can 16 is decorated by being brought into engagement with a blanket (e.g., without limitation, a replaceable adhesive-backed piece of rubber) disposed on a blanket wheel of the multicolor printing unit indicated generally by reference numeral 22. Thereafter, and while still mounted on the mandrels, the outside of each decorated can 16 is coated with a protective film of varnish applied by engagement with the periphery of a varnish applicator roll (not shown) rotating on a shaft 23 in the overvarnish unit indicated generally by reference numeral 24. Cans 16 with decorations and protective coatings thereon are then transferred from the mandrels to suction cups (not shown) mounted adjacent the periphery of a transfer wheel (not shown) rotating on a shaft 28 of a transfer unit 27. From the transfer unit 27 the cans 16 are deposited on generally horizontal pins 29 carried by a chain-type output conveyor 30, which carries the cans 16 through a curing oven (not shown).

While moving toward engagement with an undecorated can 16, the blanket wheel engages a plurality of plate cylinders 31, each of which is associated with an individual inking station 32 (an exemplary eight inking stations 32 are shown in FIG. 1). Typically, each inking station 32 provides a different color ink and each plate cylinder 31 applies a different ink image segment to the blanket. All of the "ink image" segments combine to produce a "main image" that is structured to be applied to the can body. The "main image" is then transferred to undecorated cans 16 and becomes, as used herein, the "can body applied image."

Each inking station 32 includes a plurality of rollers, or as used herein, "rolls," that are structured to transfer a quantity of ink from a reservoir, or as used herein an "ink fountain," to the blanket. The path that the ink travels is, as used herein, identified as the "ink train." That is, the rolls over which the ink travels define the "ink train." Further, as used herein, the "ink train" has a direction with the ink fountain being at the "upstream" end of the ink train and a plate cylinder 31 at the "downstream" end of the ink train.

The ink train extends over a number of rolls each of which has a purpose. As shown, the ink train starts at the ink fountain and is initially applied as a film to a fountain roll. The fountain roll is intermittently engaged by a ductor roll. When the ductor roll engages the fountain roll, a quantity of ink is transferred to the ductor roll. The ductor roll also intermittently engages a downstream roll and transfers ink thereto. The ductor roll has a "duty cycle" which, as used herein, means the ratio of the duration of the ductor roller being in contact with the fountain roller divided by the duration of a complete cycle (ductor roller in contact with the fountain roller, move to the first downstream roller, contact with first steel roller, move back to fountain roller).

The other rolls include, but are not limited to, distribution roll(s), oscillator roll(s), and transfer roll(s). Generally, these rolls are structured to distribute the ink so that a proper amount of ink is generally evenly applied to the plate cylinder 31. For example, the oscillator rolls are structured to reciprocate longitudinally about their axis of rotation so as to spread the ink as it is applied to the next downstream roll. The final roll is the plate cylinder 31 which applies the ink to the blanket. It is understood that each inking station 32 applies an "ink image" of a single selected color to the blanket and that each inking station 32 must apply its ink image in a proper position relative to the other ink images so that the main image does not have offset ink images.

The position of an image can be skewed, misprinted, or inefficient levels of ink for a specified optimal temperature required to apply an image on a container. In some instances, there is overlay of print layers which results in ink contamination and undesired colors being printed on the can. In this circumstance, hundreds or thousands of cans need to be discarded and the decorator shut down which leads to the can line as a whole being shut down and typically produce between 400 and 6000 cans per minute. This stoppage results in higher operating costs and large amounts of spoilage. In other instances, where the ambient air surrounding the decorator is unstable or difficult to control, the application of the ink may also become inconsistent due to the material properties being effected by the environmental temperature and the ability of the ink substrate being able to adhere to the can surface in addition to maintaining the thinnest film weight of the ink as possible. The tinctorial strength of the ink directly relates to the film thickness of the ink. The higher the tinctorial strength, the thinner the film thickness can be. If the tinctorial strength of the ink is not optimized, the film weight will need to be quicker and the decorator run slower. The typical temperature range suggested by ink manufacturers is between 95° and 105° F. If the ink is too cold, it will appear pin-holed on the container. If the ink temperature is too high, the ink can start to mist or apply to thinly which will also cause the image to not be shown as intended leading to higher spoilage rates. In both cases, the inability to adjust the temperature can lead to excessive ink application as an operator may increase ink flow to increase ink coverage in this circumstance. A typical decorator fountain can hold 50 ounces of ink and can be replenished on an hourly basis. In cases where the operator is compensating for poor ink density or temperature, the ink usage can easily double. There is thus room for improvement in can decorators and their components.

SUMMARY OF THE INVENTION

According to an aspect of the disclosed concept, a control system for a can decorator structured to apply images to cans comprises: a can inspection system structured to capture images of a can; a controller structured to receive the captured images and to analyze the captured images to determine a quality of the image applied to the can based on a comparison of the captured images and a reference image; and an adjustment assembly structured to adjust a circumferential or translational position of a plate cylinder attached to a plate cylinder shaft end of a plate cylinder shaft, the adjustment assembly including at least one stepper motor, wherein operation of the at least one stepper motor causes the circumferential or translational adjustment, wherein in response to determining an image registration error based on a comparison of the captured images and the reference image, the controller is structured to determine an excitation period and frequency based on the image registration error and to control the at least one stepper motor according to the determined excitation period and frequency.

According to an aspect of the disclosed concept, an adjustment assembly for a plate cylinder and a plate cylinder shaft of a can decorator comprises: a translation ring coupled to the plate cylinder shaft such that rotation of the translation ring causes a circumferential adjustment of the plate cylinder shaft and the plate cylinder attached to a plate cylinder shaft end; a guide structure disposed proximate the translation ring; cam followers attached to the guide structure and operatively coupled to the translation ring such that rotation of the cam followers causes rotation of the translation ring; and a stepper motor operatively coupled to the cam followers such that operation of the at least one stepper motor causes rotation of the cam followers.

According to an aspect of the disclosed concept, an adjustment assembly for a plate cylinder and a plate cylinder shaft of a can decorator comprises: a shaft housing coupled to the plate cylinder shaft and a plate cylinder shaft end such that axial movement of the shaft housing causes a translational adjustment of the plate cylinder shaft end and the plate cylinder attached to the plate cylinder shaft end; a translation coupling member having a first end coupled to the shaft housing such that the shaft housing and the translation coupling member move in conjunction; a translation guide coupled to a second end of the translation coupling member such that the translation guide and the translation coupling member move in conjunction; and a stepper motor operatively coupled to the translation guide such that operation of the at least one stepper motor causes linear movement of the translation guide and the plate cylinder shaft end.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
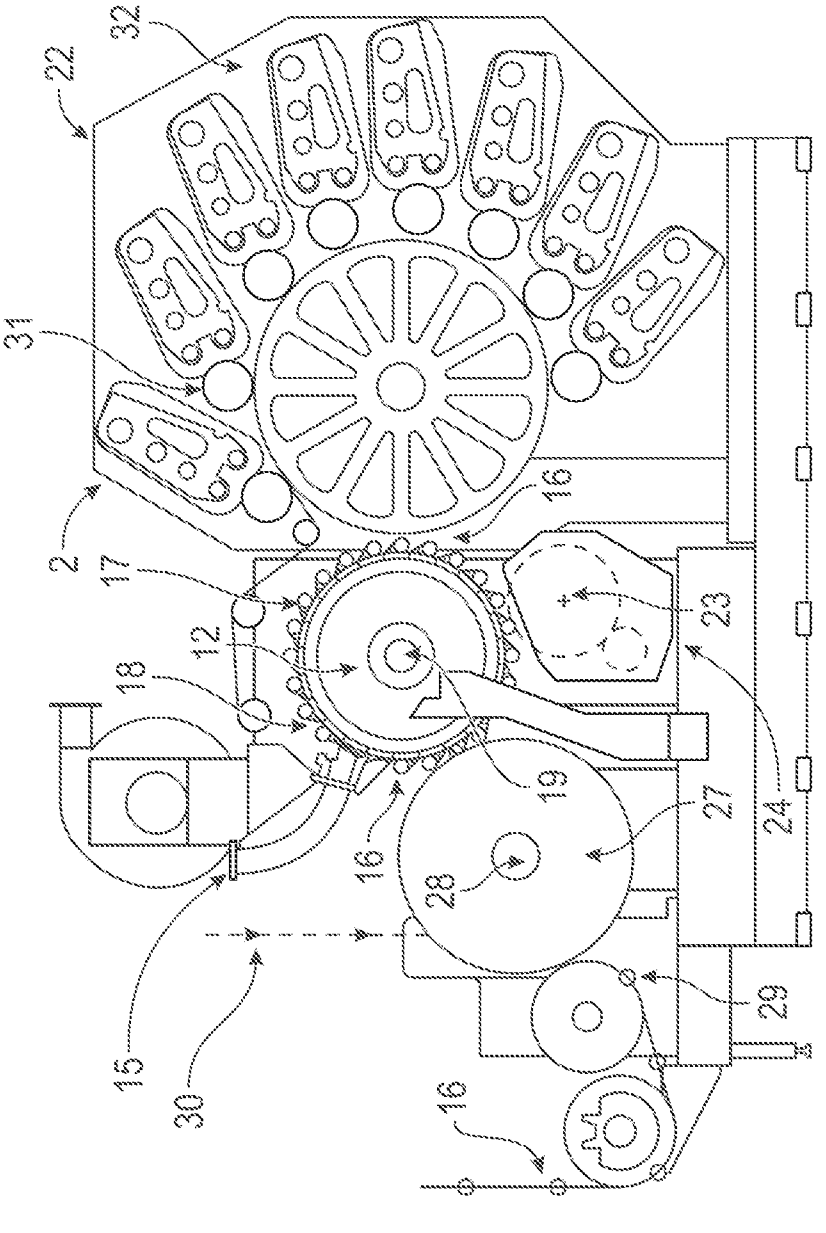
FIG. 1 is a schematic diagram of a can decorator.
Figure 2:
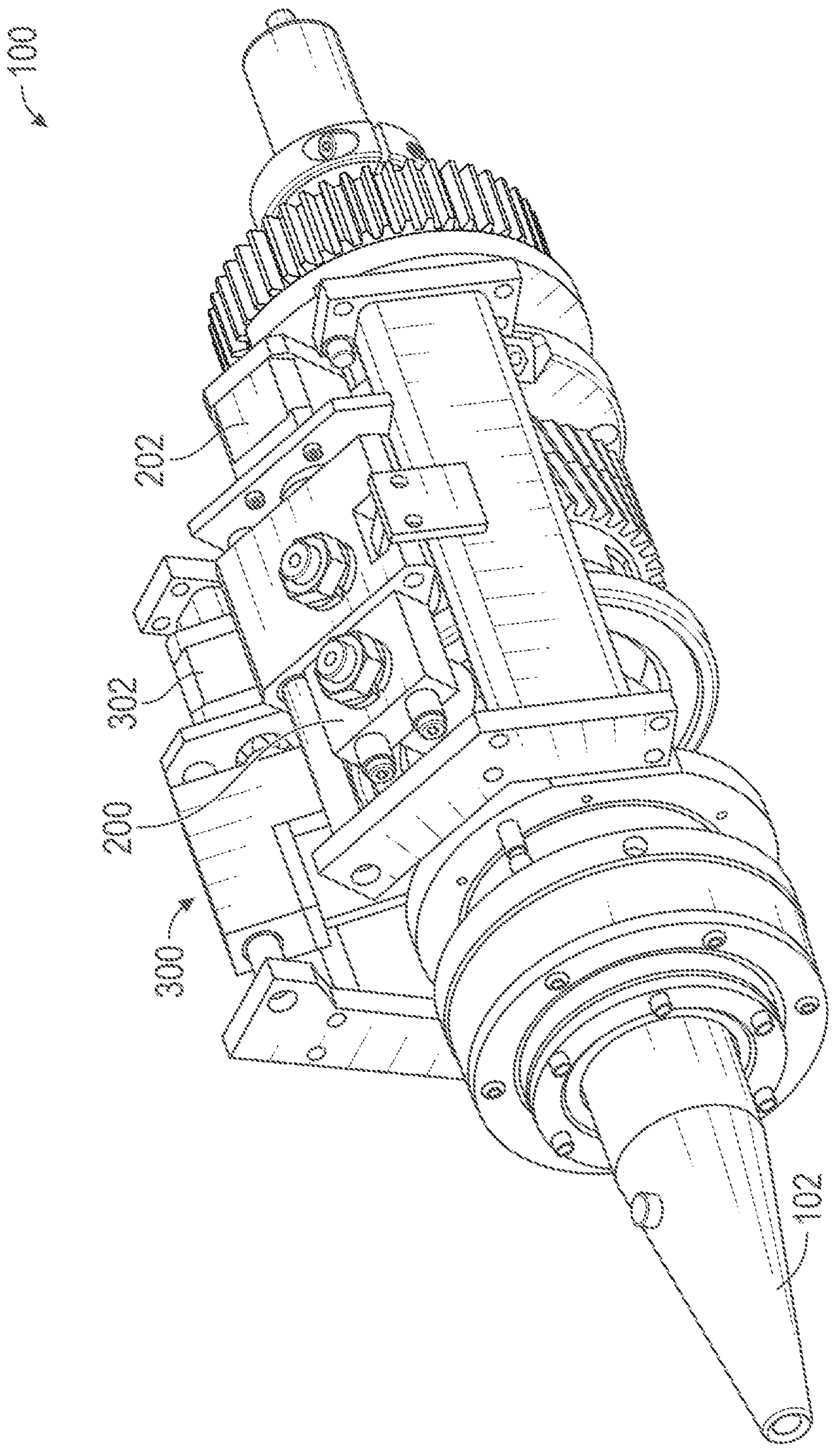
FIG. 2 is an isometric view of a plate cylinder shaft assembly including a circumferential adjustment assembly and a translational adjustment assembly in accordance with an example embodiment of the disclosed concept.

FIG. 2 is an isometric view of a plate cylinder shaft assembly 100 including a circumferential adjustment assembly 200 and a translational adjustment assembly 300 in accordance with an example embodiment of the disclosed concept. The plate cylinder shaft assembly 100 is structured to receive a plate cylinder, such as the plate cylinder 31 shown in FIG. 1, at a plate cylinder shaft end 102. The plate cylinder shaft assembly 100 may be employed in a can decorator such as the can decorator 2 shown in FIG. 1 or other types of can decorators. The plate cylinder shaft assembly 100 is structured to provide adjustment to the circumferential position of an attached plate cylinder via the circumferential adjustment assembly 200 and adjustment to the translational position of an attached plate cylinder via the translational adjustment assembly 300. The circumferential adjustment is a rotational adjustment of the plate cylinder and the translational adjustment is an axial adjustment of the plate cylinder. The circumferential adjustment assembly 200 and the translational adjustment assembly 300 are driven by stepper motors 202 and 302, respectively. In some example embodiments, the stepper motors 202,302 have between 50-100 pins adjust positions by a set amount defined by the pin spacing, period of excitation, and frequency of excitation of the stepper motor 202,302 using an excitation algorithm. A stepper motor allows for the use of less components and costs are significantly lower than other motor types available.

Figure 3:
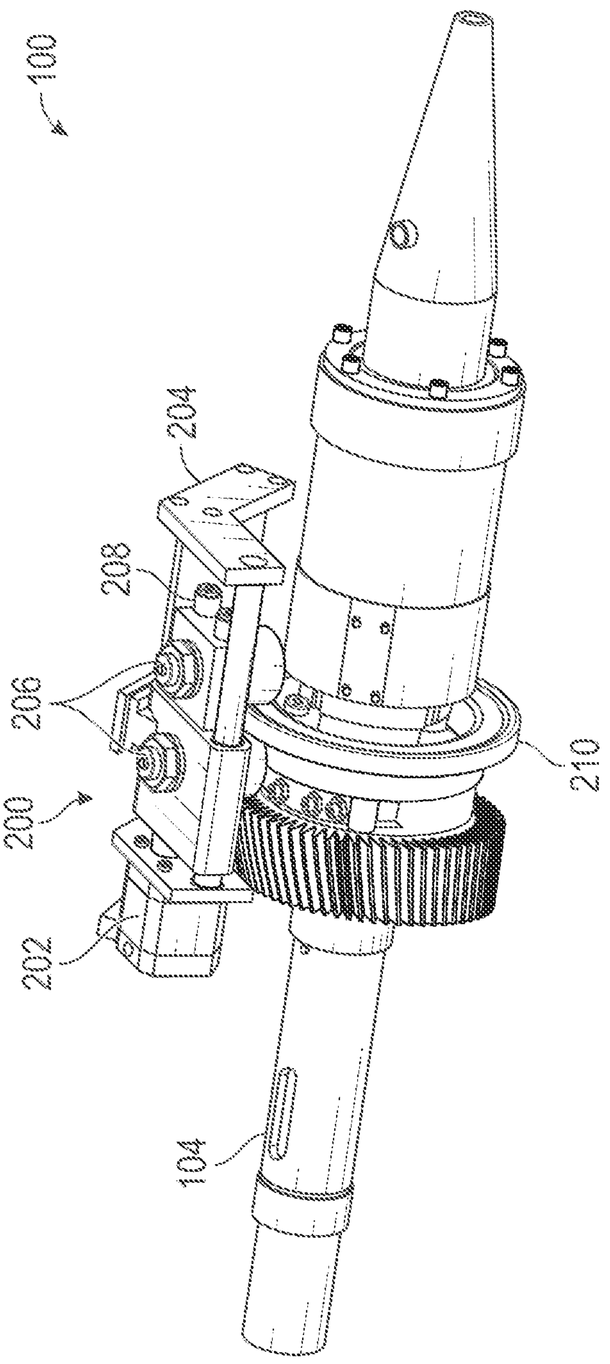
FIG. 3 is a view of a plate cylinder shaft assembly with a circumferential adjustment assembly in accordance with an example embodiment of the disclosed concept.
Figure 4:
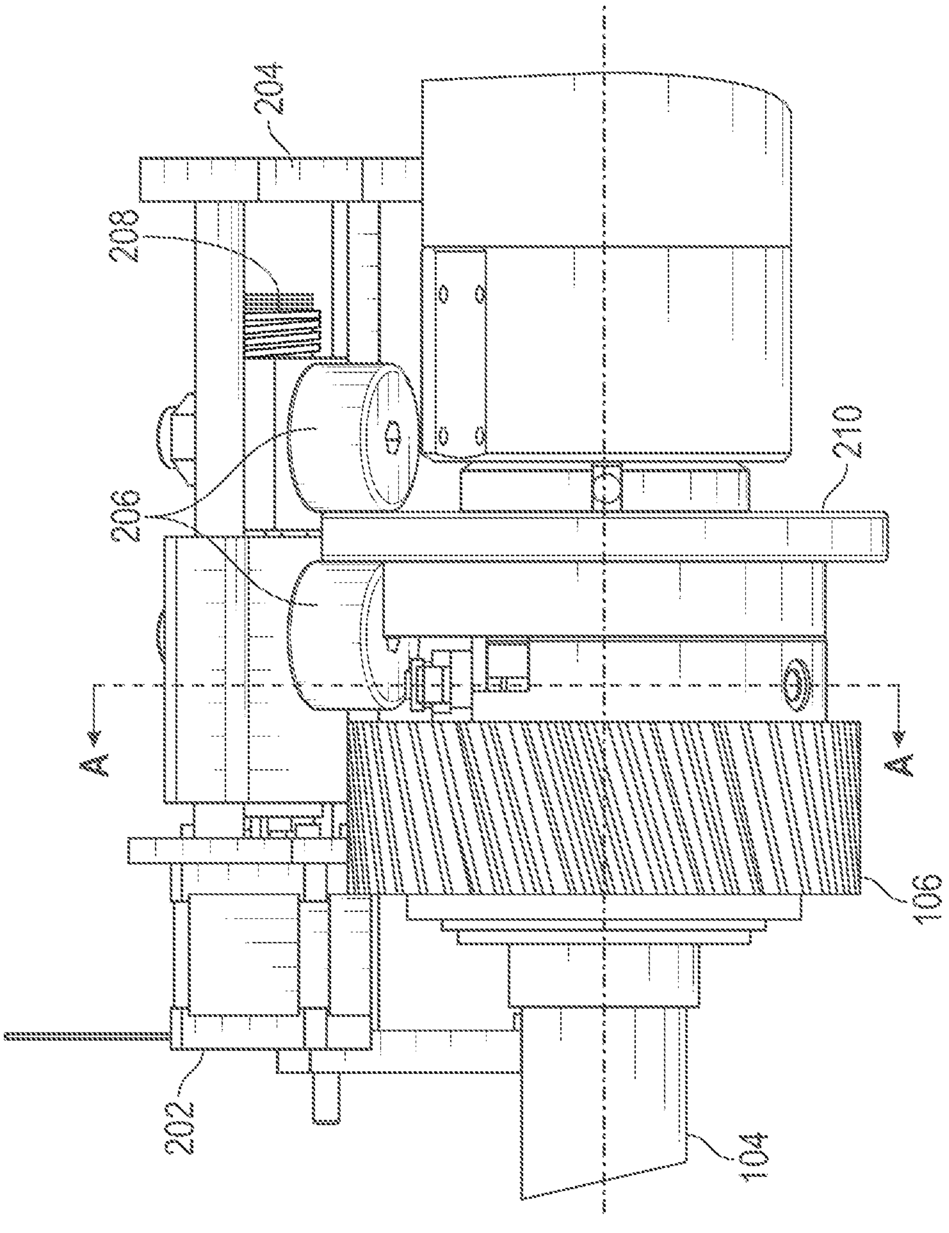
FIG. 4 is an elevation view of a portion of a plate cylinder shaft assembly with a circumferential adjustment assembly in accordance with an example embodiment of the disclosed concept.
Figure 5:
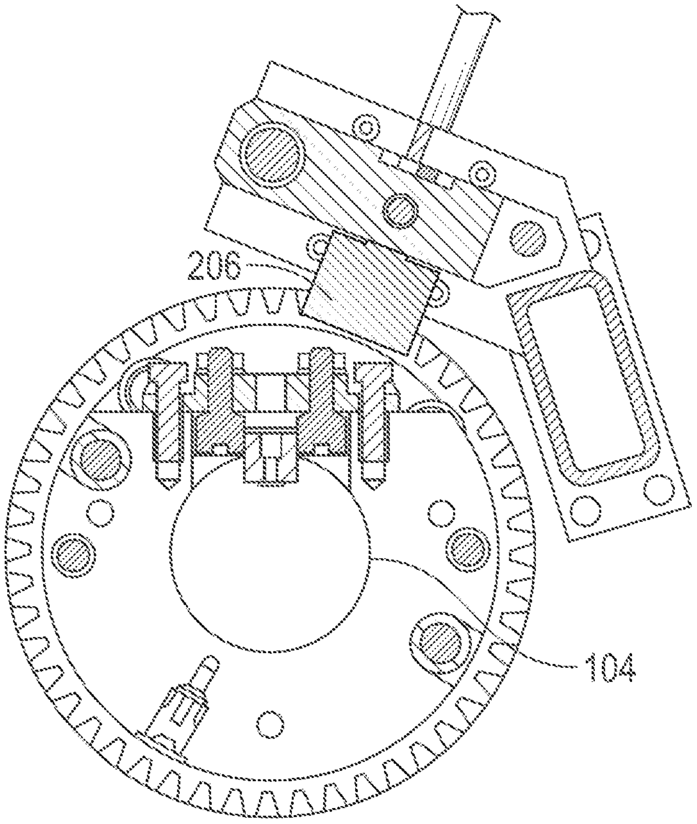
FIG. 5 is a cross-sectional view of the plate cylinder shaft assembly of FIG. 4.

FIG. 3 is a view of the plate cylinder shaft assembly 100 with the circumferential adjustment assembly 200 in accordance with an example embodiment of the disclosed concept. FIG. 4 is an elevation view of a portion of the plate cylinder shaft assembly 100 with the circumferential adjustment assembly 200 and FIG. 5 is a cross-sectional view of the plate cylinder shaft assembly 100 of FIG. 4. It will be appreciated that in example embodiments of the disclosed concept, the plate cylinder shaft assembly 100 may include just the circumferential adjustment assembly 200, just the translational adjustment assembly 300, or both the circumferential adjustment assembly 200 and the translational adjustment assembly 300.

The circumferential adjustment assembly 200 includes the stepper motor 202, a guide structure 204, cam followers 206, cam follower springs 208, and a translation ring 210. The cam follower springs 208 are structured to pre-load the cam followers 206 against the translation ring 210. The cam followers 206 are attached to the guide structure 204 and are spaced apart from each other. The stepper motor 202 is operatively coupled to the cam followers 206 and is structured to control rotation of the cam followers 206. A translation ring 210 is coupled to a plate cylinder shaft 104 of the plate cylinder shaft assembly 100 such that rotation of the translation ring 210 adjusts the circumferential position of the plate cylinder shaft 104. An outer portion of the translation ring 210 is disposed between the cam followers 206 such that rotation of the cam followers 206 causes rotation of the translation ring 210. By driving the step motor 202 to rotate the cam followers 206 in a controlled manner, rotation of the translation ring 210 and circumferential adjustment of the plate cylinder shaft assembly 100 can be controlled.

Figure 6:
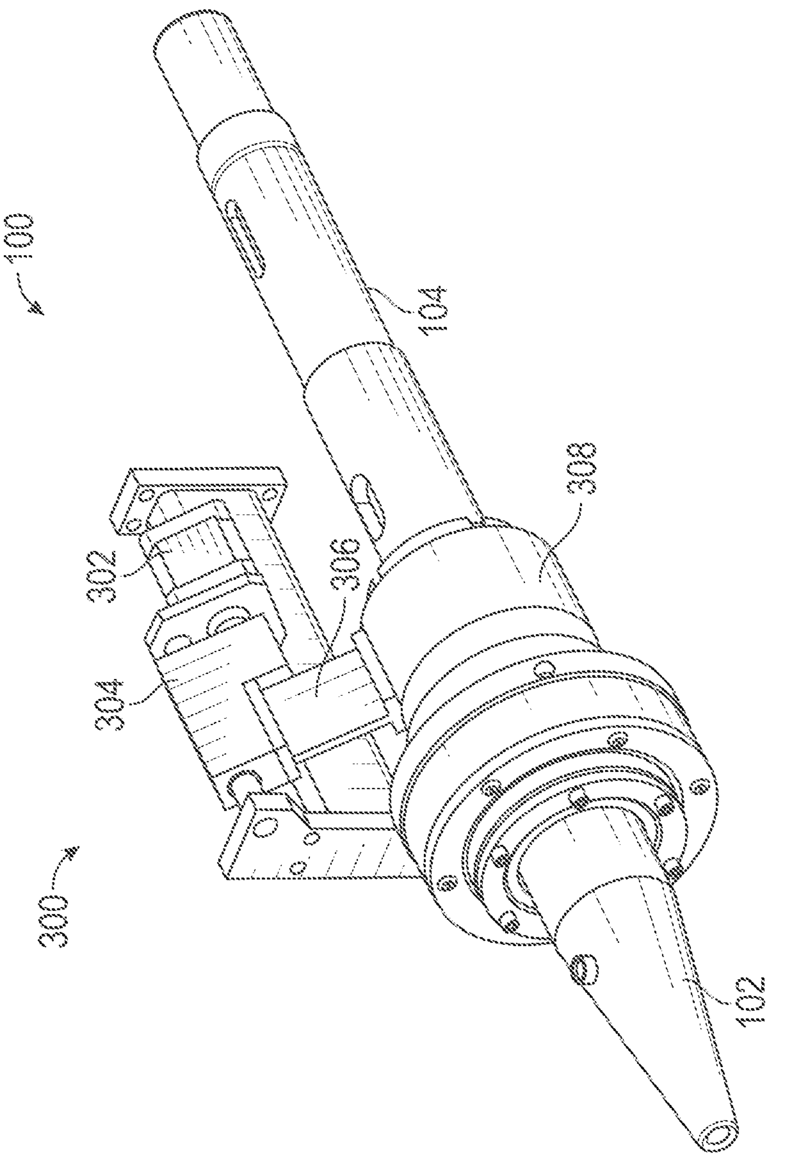
FIG. 6 is a view of a plate cylinder shaft assembly including a translational adjustment assembly in accordance with an example embodiment of the disclosed concept.
Figure 7:
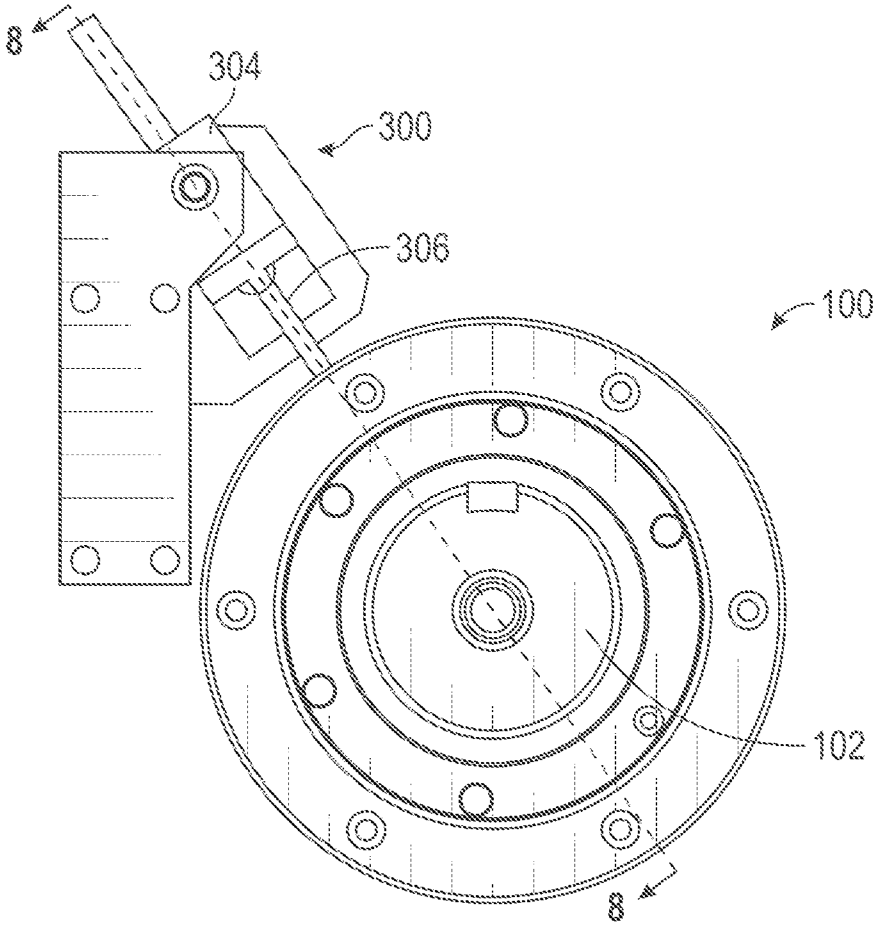
FIG. 7 is an elevation view of a plate cylinder shaft assembly including a translational adjustment assembly in accordance with an example embodiment of the disclosed concept.
Figure 8:
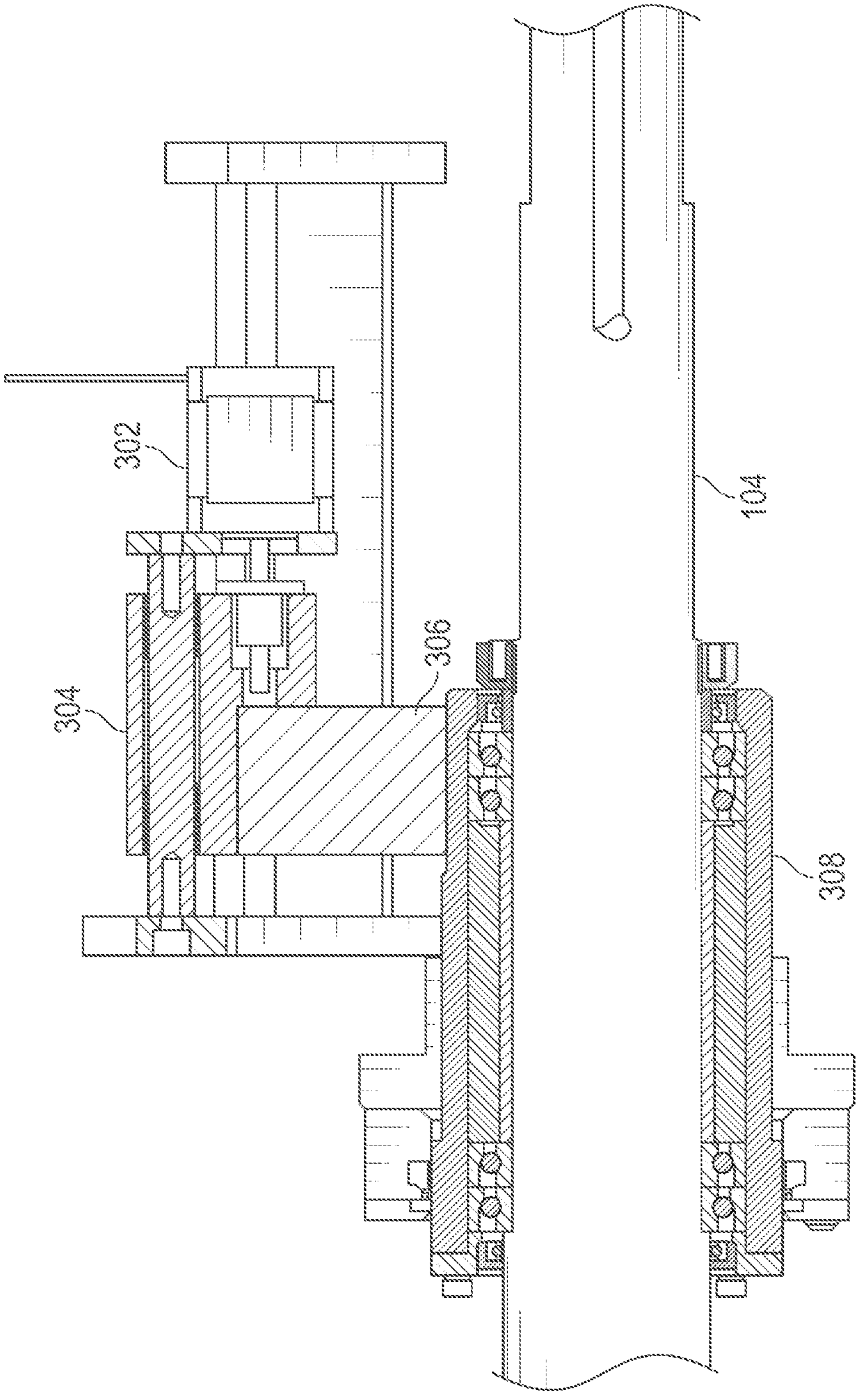
FIG. 8 is a cross-sectional view of the plate cylinder shaft assembly of FIG. 7.

FIG. 6 is a view of the plate cylinder shaft assembly 100 including the translational adjustment assembly 300 in accordance with an example embodiment of the disclosed concept. FIG. 7 is an elevation view of the plate cylinder shaft assembly 100 including the translational adjustment assembly 300 and FIG. 8 is a cross-sectional view of the plate cylinder shaft assembly 100 of FIG. 7. In FIGS. 6-8, the plate cylinder shaft assembly 100 is shown with only the translational adjustment assembly 300. However, it will be appreciated that in example embodiments of the disclosed concept, the plate cylinder shaft assembly 100 may include just the circumferential adjustment assembly 200, just the translational adjustment assembly 300, or both the circumferential adjustment assembly 200 and the translational adjustment assembly 300.

The translational adjustment assembly 300 includes the stepper motor 302, a translation guide 304, a translation coupling member 306, and a shaft housing 308. The stepper motor 302 is operatively coupled to the translation guide 304 and is structured to control the translation guide 304 to advance and retract. The shaft housing 308 is coupled to the plate cylinder shaft 104 and plate cylinder shaft end 102 of the plate cylinder shaft assembly 100. The shaft housing 308 is coupled to the translation guide 304 via the translation coupling member 306 such that the translation guide 304, coupling member 306, and shaft housing 308 all move in conjunction. The shaft housing 308 is also coupled to the plate cylinder shaft end 102 such that movement of the shaft housing 308 causes translational adjustment of the plate cylinder shaft end 102. Driving the stepper motor 302 to advance or retract the translation guide 304 thus causes a controllable translational adjustment of the plate cylinder shaft end 102 and any plate cylinder attached to the plate cylinder shaft end 102.

Figure 9:
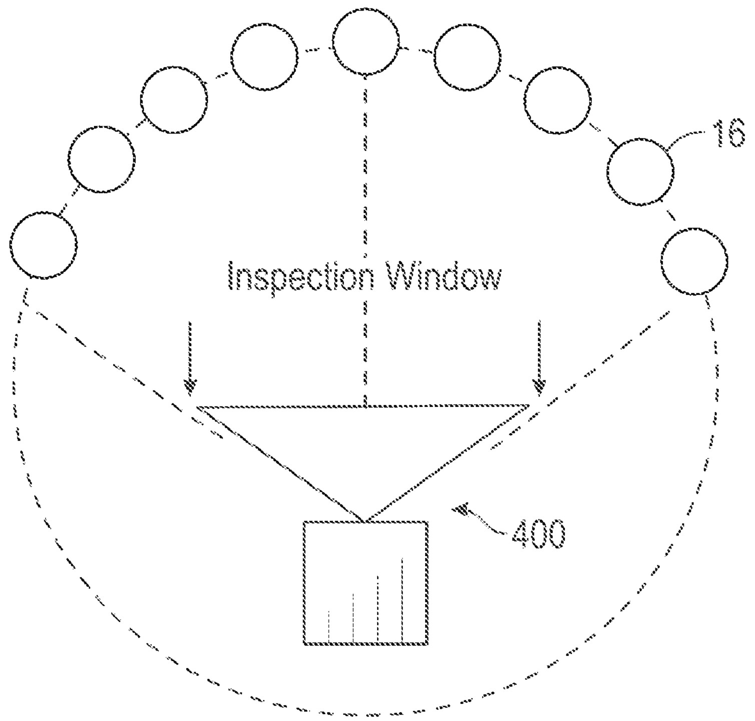
FIG. 9 is a schematic diagram of a can inspection system in accordance with an example embodiment of the disclosed concept.

FIG. 9 is a schematic diagram of a can inspection system in accordance with an example embodiment of the disclosed concept. The can inspection system includes a camera 400 for inspecting cans 16. The camera 400 captures images of cans 16 as they pass through an inspection window. The cans 16 are carried by rotating can pads through the inspection window. The rotating can pads rotate the cans 16 through at least a full 360 degree rotation while the cans 16 move through the inspection window. Thus, the camera 400 is able to capture images of all sides of a can 16 passing through the inspection window. The images may be used to determine the quality of images printed on the cans and determine, for example, image registration, ink density, ink color, ink smearing, other image defects. The can inspection system may be located at any suitable location in the can making process such as, for example and without limitation, at a pin chain, a transfer wheel, inside a curing oven, or any other suitable location. In some example embodiments, the can inspection system may be structured such that the camera 400 moves around a can along a focal arc. In some example embodiments, the can inspection system may use a wide lens that keeps a common focal point for an object moving along a linear path for a defined distance. It will also be appreciated that other types of photoelectric sensors may be used instead of or in addition to the camera 400.

Figure 10:
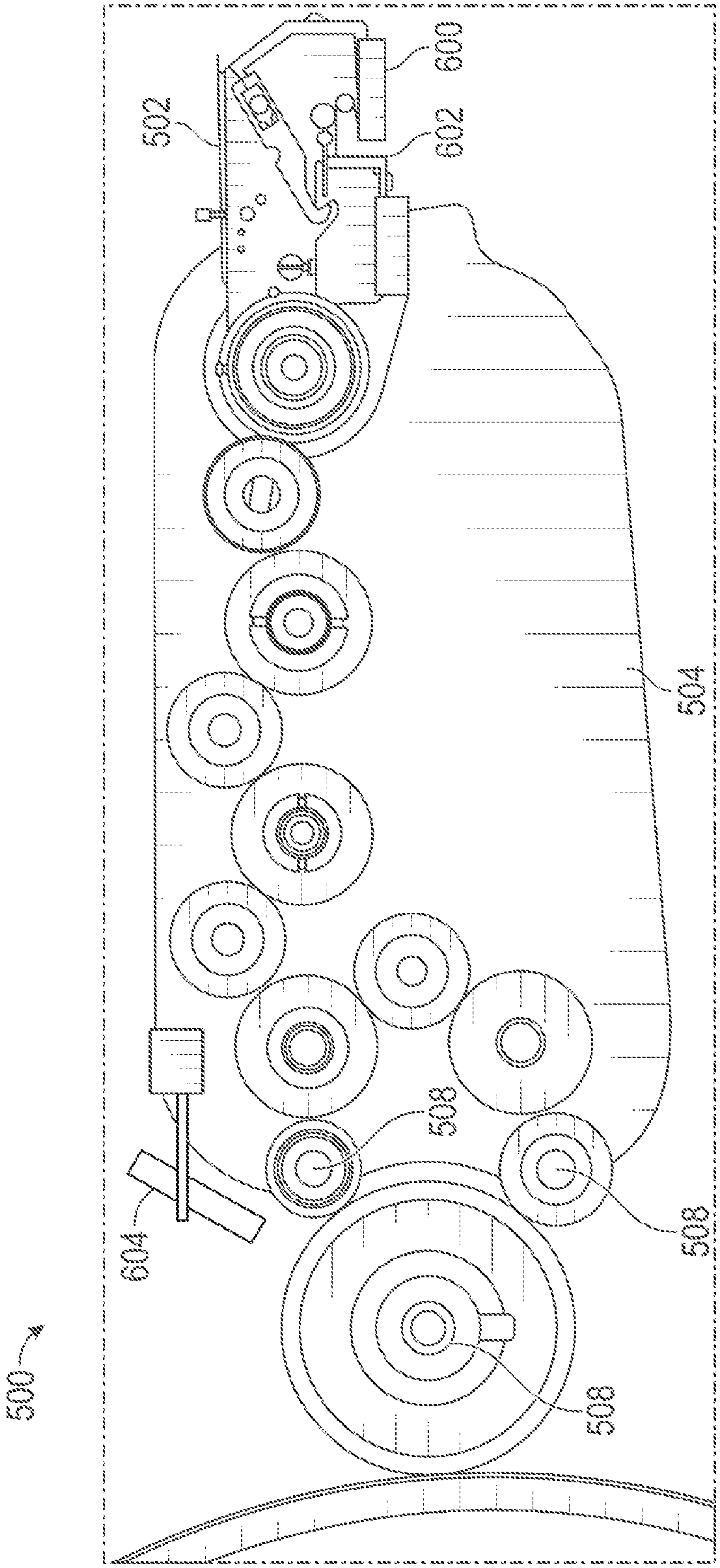
FIG. 10 is a schematic diagram of an inker station with temperature sensing and adjustment in accordance with an example embodiment of the disclosed concept.

FIG. 10 is a schematic diagram of an inker station 500 with temperature sensing and adjustment in accordance with an example embodiment of the disclosed concept. The inker station 500 includes a fountain 502 and a roller assembly 504. The fountain 502 is structured to hold ink which is transferred via the roller assembly 504 to a plate cylinder 506. The plate cylinder 506 applies an ink image to the blanket wheel where it is then transferred to a can.

The inker station 500 includes an ink temperature control element 600, for example, at the fountain 502. The ink temperature control element 600 may be, for example a heating element. The inker station 500 also includes one or more ink temperature sensors 602,604. The ink temperature sensors 602,604 may be, for example, a contact ink temperature sensor 602 that senses temperature via direct contact with the ink, or a non-contact ink temperature sensor 604 that senses temperature without direct contact. The ink temperature sensors 602,604 may be disposed at any suitable location in the inker station 500, for example at the plate cylinder 506, at the blanket wheel, at a mandrel, at various point on the roller assembly 504, in the fountain 502, or in any other suitable location. In some example embodiment, cooling ports 508 may be included on one or more of the rolls of the roller assembly 504 or the plate cylinder 506. The cooling ports 508 may also be considered ink temperature control elements.

Figure 11:
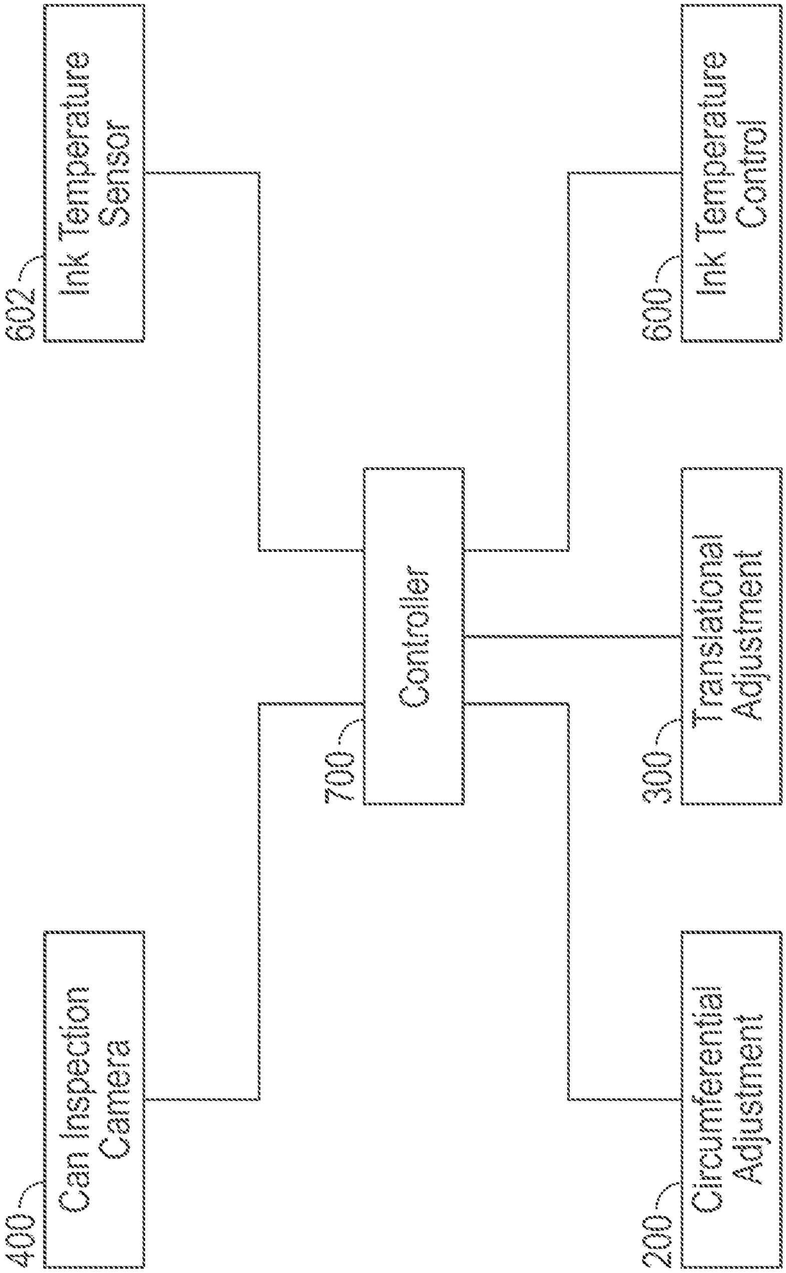
FIG. 11 is a schematic diagram of a can decorator inspection and control system in accordance with an example embodiment of the disclosed concept.

FIG. 11 is a schematic diagram of a can decorator inspection and control system in accordance with an example embodiment of the disclosed concept. The can decorator inspection and control system includes a controller 700. The controller 700 is structured to receive inputs from various components and to control various components of the can decorator. It will be appreciated that the inputs and outputs of the controller 700 may be wired or wireless. The can decorator inspection and control system includes the can inspection camera 400. The controller 700 is structured to receive and analyze images output from the can inspection camera 400. The controller 700 analyzes the images to determine the quality of the cans, and, in particular, the quality of the ink images applied to the cans. The controller 700 may, for example, compare the captured images to a "proof image" assigning inspection criteria to specific fields such as ink overlap, alignment, and ink density. For example, the controller 700 may determine whether the ink images applied to the cans are positioned properly. The controller 700 is structured to adjust components of the can decorator in response to determining the quality of the ink images. For example, the controller 700 is structured to control the circumferential adjustment assembly 200 and the translational adjustment assembly 300. The controller 700 may control the circumferential adjustment assembly 200 and the translational adjustment assembly 300 by exciting the stepper motor 202 or 302. For example, based on the alignment correction needed, the controller 700 may make a circumferential or translational adjustment of a set amount defined by exciting the stepper motor 202 or 302 for a selected period and frequency of excitation depending on the pin spacing of the stepper motor 202 or 302. The period and frequency of the stepper motor 202 or 302 can have various excitation ranges depending on the movement required. For large adjustments in the range of 0.008 in to 0.25 in, the excitation frequency would be lower and periods longer as accuracy will not be as important. For precise and fine-tuned adjustments which are under 0.008 in and can be as low as 0.0001 in, a higher frequency setting with shorter periods would be utilized, which in turn would create finer movements for higher precision. Adjustments to the circumferential adjustment assembly 200 and the translational adjustment assembly 300 may be used to correct alignment deficiencies in the ink images quickly, and may be done for example while the can decorator is down during a label change.

In some example embodiments, the controller 700 may control various components such as, without limitation, the circumferential adjustment assembly 200 and the translational adjustment assembly 300 in a prescribed motion, which may be, for example, stored settings specific to the label, a general home position, or a position defined by the operator. When the controller 700 analyzes the captured images of cans and compares them to the "proof image," the controller 700 may create a range of acceptable values or a bound. The bound may be determined dynamically. The bound is determined over many samples or no less than three to define a statistical capability curve of the can decorator itself using sample data collected over many runs. For each unique label or unique run of a label, an additional subset of bounds is applied to create an optimized range specific to each label and run. When the image data collected fall outside of the optimized bounds, the controller 700 then excites the stepper motors 202 and/or 302 to drive the circumferential adjustment assembly 200 and/or the translational adjustment assembly 300 to move correspondingly to be within the optimized bounds. It is important to understand how the behavior of each can decorator differs as the components comprising of the decorator as whole can wear and be of different ages or manufactured slightly different. If simple bounds were set without understanding the behavior of the can decorator or how it effects a specific label, the can decorator will be susceptible high energy usage and motor fatigue due to the continuous adjustment process. Additionally, it allows for the most accurate image application for each unique label.

In some example embodiments, the controller 700 is also structured to receive outputs of the ink temperature sensor 602 and/or 604. The controller 700 is structured to analyze the outputs to determine the temperature of the ink. The controller 700 is also structured to control the ink temperature control element 600 based on the determined temperature of the ink, for example to control the temperature of the ink to be an optimal ink temperature. This is important as the properties of the ink can be changed with temperature and allow for the most optimal and efficient ink application to the print blanket and can for each ink type. The optimal ink temperature is typically defined by the ink manufacturer.

In some example embodiments, the controller 700 may also determine the ink density for application of half tones and color shading where the can colors seen with the human eye are actually compromised of several small dots that do not overlap and create a lighter, darker, or appearance of a blended of color depending on the quantity of ink applied. It is important these small dots do not overlap as this can create contamination of the ink and cause un-intended colors to be applied to the can or result in too little or too much ink to be applied which an operator may mistakenly attempt to adjust at the ink fountain. The controller 700 may be structured to control various components of the can decorator such as, for example, plate pressure or pneumatic ductor interval to adjust ink density to a desired level.

The controller 700 may utilize an application programming interface (API) to communicate with various components of the can decorator or external components. The controller 700 may control adjustments to various components of the can decorator independently based on feedback from various sensors. The controller 700 may also control adjustments to various components of the can decorator based on user input such as, for example, settings provided by an operator.

Various example embodiments of the disclosed concept improve the operation of can decorators by for example, improving quality, reducing maintenance and downtime, and improving efficiency.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A control system for a can decorator structured to apply images to cans, the control system comprising:

a can inspection system structured to capture images of a can;

a controller structured to receive the captured images and to analyze the captured images to determine a quality of the image applied to the can based on a comparison of the captured images and a reference image; and an adjustment assembly structured to adjust a circumferential or translational position of a plate cylinder attached to a plate cylinder shaft end of a plate cylinder shaft, the adjustment assembly including at least one stepper motor, wherein operation of the at least one stepper motor causes the circumferential or translational adjustment, wherein in response to determining an image registration error based on a comparison of the captured images and the reference image, the controller is structured to determine an excitation period and frequency based on the image registration error and to control the at least one stepper motor according to the determined excitation period and frequency, wherein the adjustment assembly comprises:

a translation ring coupled to the plate cylinder shaft such that rotation of the translation ring causes a circumference adjustment of the plate cylinder shaft and the plate cylinder attached to the plate cylinder shaft end, a guide structure disposed proximate the translation ring, and cam followers attached to the guide structure and operatively coupled to the translation ring such that rotation of the cam followers causes rotation of the translation ring, wherein the at least one stepper motor is operatively coupled to the cam followers such that operation of the at least one stepper motor causes rotation of the cam followers.

2. The control system of claim 1, further comprising:

an ink temperature sensor structured to sense a temperature of ink in the can decorator; and an ink temperature adjustment element structured to adjust the temperature of the ink, wherein the controller is structured to receive the sensed temperature of the ink, to compare the sensed temperature of the ink to an optimal ink temperature, and to control the ink temperature adjustment element to adjust the temperature of the ink to the optimal ink temperature.

3. The control system of claim 2, wherein the ink temperature adjustment element is a heating element disposed at a fountain of an inker station of the can decorator.

4. The control system of claim 2, wherein the ink temperature adjustment element is a cooling port disposed at a roller assembly or plate cylinder of an inker station of the can decorator.

5. The control system of claim 2, wherein the ink temperature sensor is disposed at a plate cylinder or fountain of an inker station of the can decorator.

6. The control system of claim 1, wherein the adjustment assembly further comprises:

cam follower springs structured to pre-load the cam followers against the translation ring.

7. The control system of claim 1, wherein an outer portion of the translation ring is disposed between the cam followers.

8. The control system of claim 1, wherein the adjustment assembly comprises:

a shaft housing coupled to the plate cylinder shaft and plate cylinder shaft end such that axial movement of the shaft housing causes a translational adjustment of the plate cylinder shaft end and the plate cylinder attached to the plate cylinder shaft end;

a translation coupling member having a first end coupled to the shaft housing such that the shaft housing and the translation coupling member move in conjunction; and a translation guide coupled to a second end of the translation coupling member such that the translation guide and the translation coupling member move in conjunction, wherein the at least one stepper motor is operatively coupled to the translation guide such that operation of the at least one stepper motor causes linear movement of the translation guide and the plate cylinder shaft end.

9. The control system of claim 8, wherein the at least one stepper motor is operatively coupled to the translation guide such that operation of the at least one stepper motor causes the translation guide to advance or retract.

10. The control system of claim 1, wherein the can inspection comprises:

a camera structured to capture images of the cans as the can pass through an inspection window, and wherein the camera is structured to capture images of all sides of the cans as the cans pass through the inspection window.

11. The control system of claim 10, further comprising:

rotating pads structured to rotate the cans through a full 360 rotation while the cans pass through the inspection window.

12. The control system of claim 11, wherein the camera is structured to move around the cans in a focal arc.

13. The control system of claim 1, wherein the adjustment assembly is structured to adjust the circumferential or translational position of the plate cylinder with an accuracy of 0.008 inch or less.

14. An adjustment assembly for a plate cylinder and a plate cylinder shaft of a can decorator, the adjustment assembly comprising:

a translation ring coupled to the plate cylinder shaft such that rotation of the translation ring causes a circumferential adjustment of the plate cylinder shaft and the plate cylinder attached to a plate cylinder shaft end;

a guide structure disposed proximate the translation ring;

cam followers attached to the guide structure and operatively coupled to the translation ring such that rotation of the cam followers causes rotation of the translation ring; and a stepper motor operatively coupled to the cam followers such that operation of the at least one stepper motor causes rotation of the cam followers.

15. The adjustment assembly of claim 14, wherein the adjustment assembly further comprises:

cam follower springs structured to pre-load the cam followers against the translation ring.

16. The adjustment assembly of claim 14, wherein an outer portion of the translation ring is disposed between the cam followers.

17. An adjustment assembly for a plate cylinder and a plate cylinder shaft of a can decorator, the adjustment assembly comprising:

a shaft housing coupled to the plate cylinder shaft and a plate cylinder shaft end such that axial movement of the shaft housing causes a translational adjustment of the plate cylinder shaft end and the plate cylinder attached to the plate cylinder shaft end;

a translation coupling member having a first end coupled to the shaft housing such that the shaft housing and the translation coupling member move in conjunction;

a translation guide coupled to a second end of the translation coupling member such that the translation guide and the translation coupling member move in conjunction; and a stepper motor operatively coupled to the translation guide such that operation of the at least one stepper motor causes linear movement of the translation guide and the plate cylinder shaft end.

18. The adjustment assembly of claim 17, wherein the at least one stepper motor is operatively coupled to the translation guide such that operation of the at least one stepper motor causes the translation guide to advance or retract.

* * * * *